Z. T. KIRKHAM.
COMBINATION WAGON BODY, HAY AND HOG RACK, AND HOG CHUTE.
APPLICATION FILED MAR. 11, 1914.
1,136,813.
Patented Apr. 20, 1915.
2 SHEETS—SHEET 1.
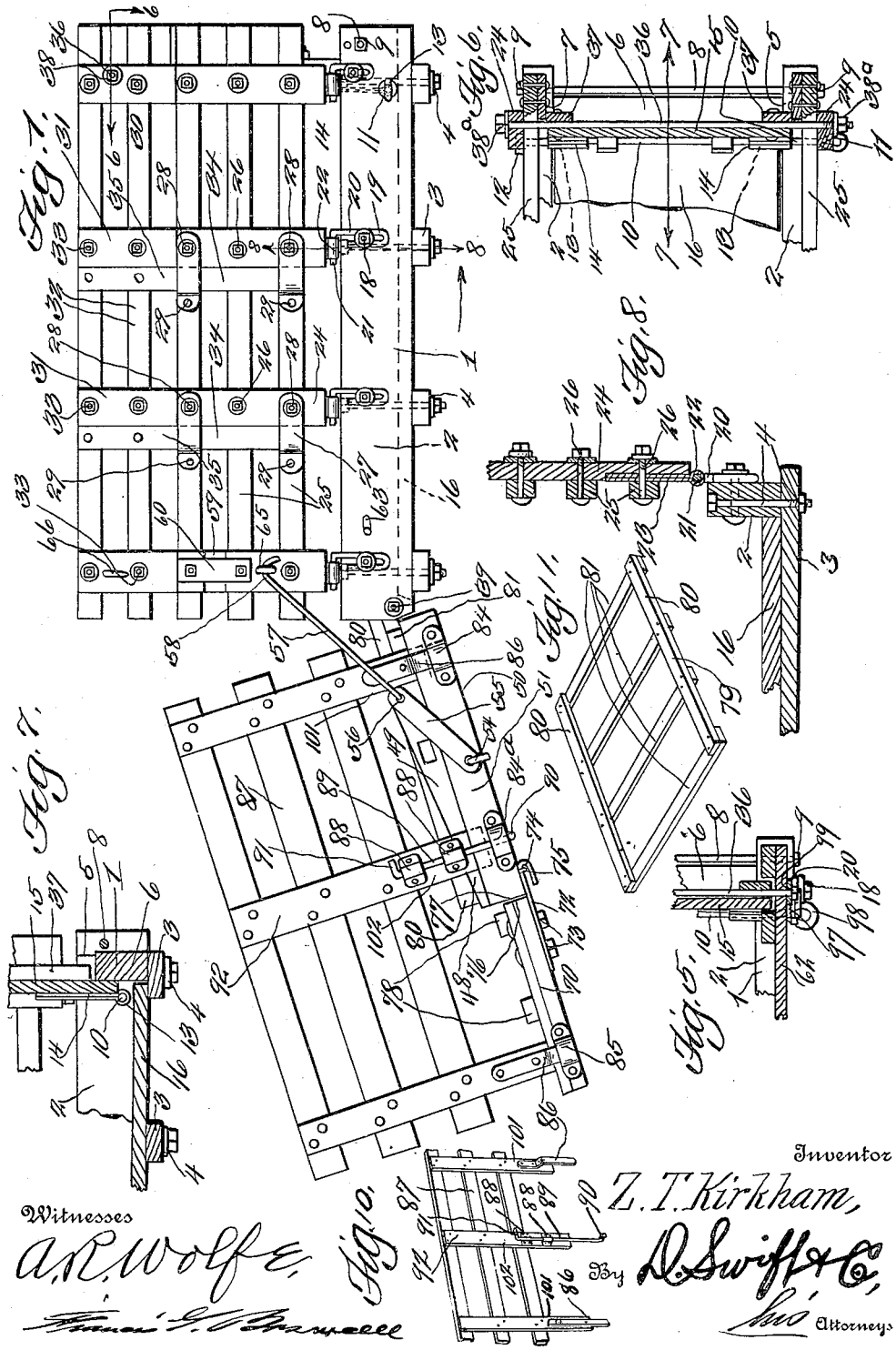
Witnesses
Inventor
Z. T. Kirkham,
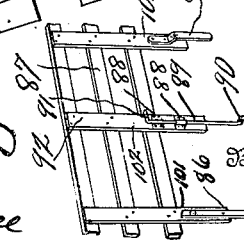
Attorneys

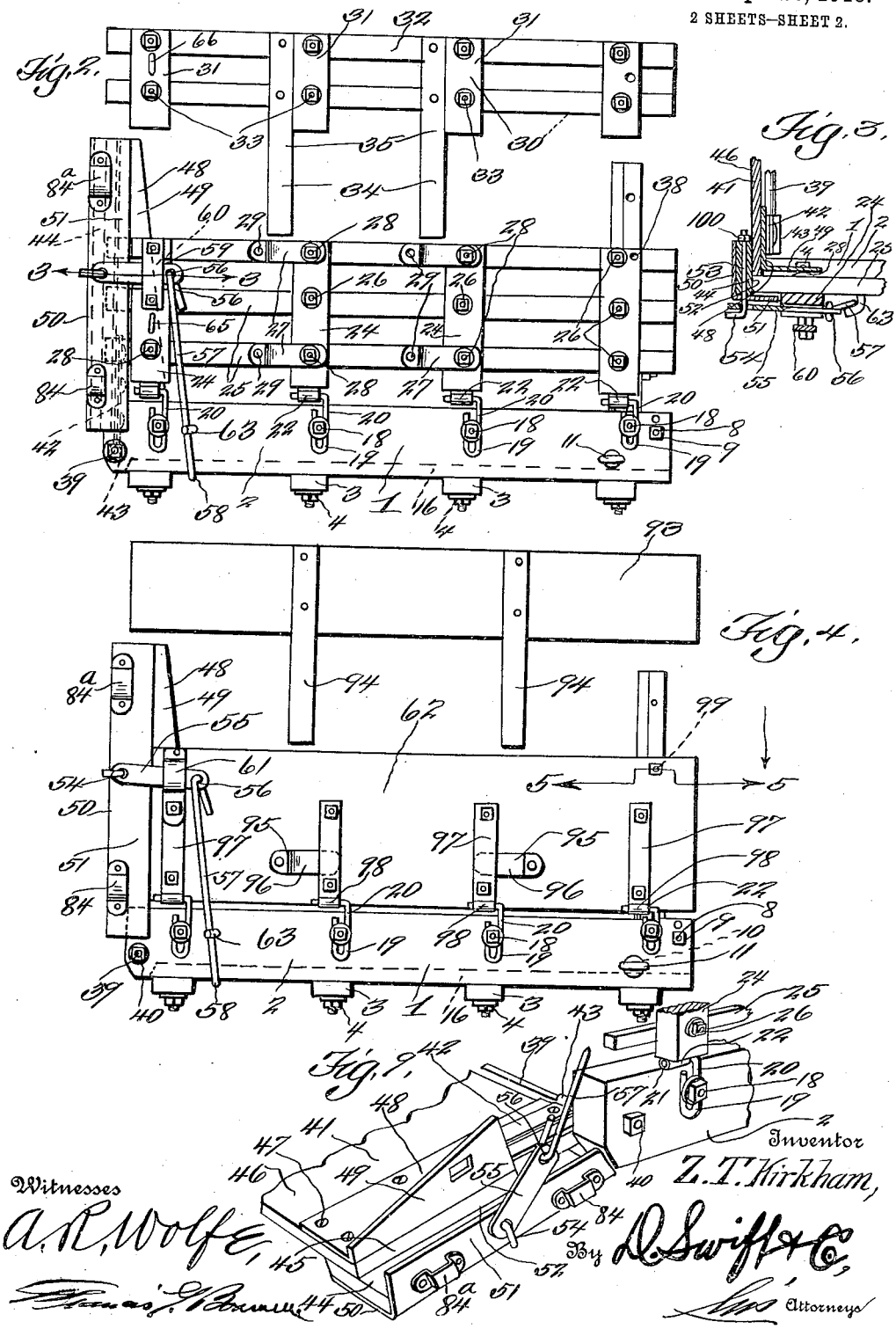

UNITED STATES PATENT OFFICE.

ZACHARIAH T. KIRKHAM, OF MOUNT STERLING, ILLINOIS.

COMBINATION WAGON-BODY, HAY AND HOG RACK, AND HOG-CHUTE.

1,136,813.  Specification of Letters Patent.  Patented Apr. 20, 1915.

Application filed March 11, 1914. Serial No. 823,953.

*To all whom it may concern:*

Be it known that I, ZACHARIAH T. KIRKHAM, a citizen of the United States, residing at Mount Sterling, in the county of Brown and State of Illinois, have invented a new and useful Combination Wagon-Body, Hay and Hog Rack, and Hog-Chute; and I do hereby declare the following to be a full, clear, and exact description of the invention, such as will enable others skilled in the art to which it appertains to make and use the same.

This invention relates to a new and useful improved wagon body, which is convertible into either a hay or hog rack including an improved tail end gate having an extension and provided with side racks, to afford an improved chute for the hogs, in order to permit them to conveniently reach the rack.

An object of the invention is to provide a device of this design including an improved tail end gate having side elongated troughs, to receive either the sides of the hog rack or the sides of the wagon body. Said end gate has side straps, to receive extensions of the side racks of the chute, said side racks constituting means to prevent the hogs from walking off the sides of the tail end gate when thrown down and the extension connected thereto, as shown in Figure 1.

One of the features of the invention is the fact that the sides of the hog rack are provided with removable upper parts, thereby decreasing the height of the sides of the hog rack, so that the apparatus may be used for hauling shoats.

Another feature of the invention is the provision of connections between the tail end gate and the sides of the rack, for holding the tail end gate in adjusted position, said connections are also designed to connect to the sides of the rack, when adjusted as a hay rack, so as to hold the tail end gate as shown in Fig. 11.

In practical fields the details of construction may be subjected to alterations, falling within the scope of what is claimed.

The invention comprises further features and combination of parts, as hereinafter set forth, shown in the drawings and claimed.

In the drawings:—Fig. 1 is a view in side elevation, showing the apparatus constructed for hauling hogs and the like, illustrating the tail end gate and its extension lowered to an inclined position including the side racks, thereby constituting a chute for the hogs to walk up into the rack. Fig. 2 is a side elevation, showing the tail end gate closed, and illustrating the upper portion of the sides of the hog rack removed, so that the apparatus may be used for hauling shoats or other similar live stock. Fig. 3 is a sectional view on line 3—3 of Fig. 2, showing the ends of the sides of the hog rack received in the troughs of the tail end gate. Fig. 4 is a side elevation showing the apparatus constructed as a wagon body, showing the upper portions or extensions of the sides of the body removed and disposed above. Fig. 5 is a sectional view on line 5—5 of Fig. 4, showing the manner or connection of the forward end of the wagon body with one of the sides of the wagon body. Fig. 6 is a sectional view on line 6—6 of Fig. 1, showing the connections between the forward end of the hog rack and the sides thereof. Fig. 7 is a sectional view on line 7—7 of Fig. 6, showing the pivotal connection between the forward ends of the hog rack and the base thereof. Fig. 8 is a sectional view on line 8—8 of Fig. 1 showing the pivotal connection between one of the sides of the hog rack and the base thereof. Fig. 9 is a detail perspective view of a fragmentary portion of the base of the hog rack and the tail end gate. Fig. 10 is a detail view of one of the side racks 87. Fig. 11 is a detail perspective view of the frame 80.

Referring more especially to the drawings, 1 designates the base portion, which comprises the side longitudinal beams 2, to which the transverse beams 3 are bolted as at 4. The inner faces of the beams 2 at their forward ends are provided with recesses 5, in which the ends of the forward end beam 6 are arranged. The ends of the beam 6 are reduced and designated by the numerals 7, and are connected in said recesses 5 in a tongue and groove manner. Extending through the forward ends of the beams 2 is a rod 8 having nuts 9 on its ends, and constituting means to strengthen or reinforce the beams 2 relative to one another. Also extending through the beams 2 is a pivot rod 10 having an eye 11 at one end and a nut 12 at the other, and on this rod the eyes 13 of the metal straps 14 are pivoted, as shown in Figs. 1, 6 and 7. The straps 14 are carried by the forward end piece or gate 15, as shown. By the pivotal connection between the straps 14 and the rod 10 the forward end piece or gate 15 may be swung downwardly in a horizontal position, and when thrown down in such position the same is disposed between the side beams 2 and the bottom 16 of the base of the apparatus. This bottom 16 is designed to slide into position and rest upon the transverse beams 3.

Bolted to the beams 2 upon their outer faces by means of the bolts 18 are the loops 19 of the rods 20, which are provided with horizontally arranged end portions 21 extending at right angles to the rods 20. These horizontal portions 21 act as bearings for the eyes or loops 22 of the metallic straps 23, which are carried by the vertical bars 24 of the sides of the hog rack. In this manner the sides of the hog rack are pivotally connected to the beams 2. The longitudinal bars 25 of the sides of the hog rack are bolted at 26 to the vertical bars 24. Bolted to two of the vertical bars 24 and two of the longitudinal bars 25 are metallic straps 27; their bolting connections are designated by the characters 28 and 29. The sides of the hog rack are provided with top extension parts 30, one upon each side. Each extension part 30 comprises the bars 31 and the longitudinal bars 32, bolted together at 33. When each extension part 30 is connected to the lower parts of the sides of the hog rack, the bars 31 are alined with the bars 24, then said part 30 is lowered so that the end portions 34 of the bars 35 will enter between the straps 27 and the longitudinal bars 25, as shown clearly in Figs. 1 and 2. When it is desired to use the apparatus for hauling shoats or other small live stock, the extension parts 30 are detached, as shown in Fig. 2. When the extension parts 30 are used as shown in Fig. 1, a rod 36 is passed through one of the bars 31, and through the cleats 37 of the forward end piece or gate 15, and provided with the usual nuts 38ª for holding the rod 36 in place, and also holding the sides of the hog rack and the extensions or parts 30 clamped securely adjacent the forward end piece or gate 15. However, when the extension parts 30 are removed, as shown in Fig. 2, the same rod 36 is designed to pass through the lower parts of the sides of the hog rack, as shown at 38, and through said cleats 37, but just a little below where said rod was inserted in the first instance. Passing through the rear ends of the beams 2 is a pivot rod 39 having nuts 40 on its ends. As shown in the drawings the tail end gate 41 is provided with metallic straps 42 having loops or eyes 43, through which the rod 39 passes, thereby pivotally mounting the tail end gate upon said rod, so that the gate may be pivotally lowered in adjusted positions, or disposed in a rearwardly downwardly inclined position, as shown in Fig. 1. The tail end gate is supplied with cleats 44, the outer longitudinal edges of which are spaced apart or offset from the edges 45 of the part 46 of the tail end gate. Secured at 47 to the part 46 of the tail end gate are metallic angle members 48, the flanges 49 of which are alined or arranged parallel with the edges 45 of the part 46. Secured to the cleats 44 are the metallic angle members 50. The flanges 51 of the angle members 50 and the flanges 49, and the edges 45 of the parts 46 form troughs 52, which, when the tail end gate is thrown in a vertical position, receive the rear ends of the bars 25 and 32, as shown clearly in Fig. 2, thereby holding the rear portions of the sides of the hog rack braced relative to one another. Adjacent the pivot of the tail end gate the troughs 52 are somewhat wider, so as to receive the rear end of the beams 2, that is, when the tail end gate is disposed in a vertical position. Projecting laterally of the flanges 51, but passing through the cleats 44 are the shanks 53 of the angle members 54. Links 55 are connected to the angle members 54 as shown at 59, and also in Fig. 1. The links 55 are in turn connected at 56 to the rods 57 having angled ends 58. When the tail end gate is disposed in a vertical position, as shown in Figs. 2 and 4, links 55 pass through the recess 59 (which is covered by the metallic strap 60 as shown in Fig. 2), or is passed between the metallic strap and the solid side 62 of the wagon body shown in Fig. 4. When the tail end gate and the link 55 are so disposed the rod 57 is disposed in a vertical position, as shown in Figs. 2 and 4, with its angled end 58 under the base of the apparatus. In this case the rod is disposed behind the angularly disposed lug 63 of each beam 2, thereby locking the rod 57 in position, and holding the tail end gate securely in a vertical position, as shown, and the link 55 in the straps 60 and 61. When the tail end gate is inclined on its pivot as shown in Fig. 1, the angled end 58 of the rod 57 engages the eye 65, to assist in supporting the gate.

A tail end gate extension member 70 is provided and to which the metallic strips 72 are bolted at 73. These strips 72 are constructed with hooks 74 to engage the loops 75 of the under face of the tail end gate, as shown in Fig. 1. The edge portion 76 of the extension member 70 abuts the end portion 77 of the tail end gate, when the member 70 and the gate are disposed as in Fig. 1, so as to prevent said parts from sagging at the points 76 and 77, the engagement of the hooks 74 with the loops 75 assisting in preventing such sagging. In this manner the tail end gate and the extension member 70 afford a walk or chute up which the hogs or other live stock are allowed to pass into the hog rack, there being cleats 78 to enable the hogs or live stock to gain a foothold to prevent their slipping backwardly. Detachably resting upon the tail end gate when the same is disposed as shown in Fig. 1 is a frame 79 comprising the bars 80 and the transverse cleats 81, which also enable the hogs or live stock to gain a foot hold in ascending to the hog rack. Secured to the flanges 51 of the angled members 50 are arched straps 84, and to the side edges of the member 70 similar arched straps 85 are secured. These straps 84 and 85 constitute means to receive the metallic extensions 86 of the removable side racks 87, to hold the same in upright positions as shown in Fig. 1. These removable side racks 87 prevent the hogs or live stock from walking off the sides of the chute. Each of the side racks 87 is provided with arched bearing straps 88, in which a rod 89 is mounted. The lower end of each rod 89 has an angled portion 90, designed to be thrown at right angles to the flange 51 of the tail end gate, that is, after the lower end of the rod 89 passes between the arched strap 84ᵃ and the flange 51, thereby holding each side rack 89 securely in place. The upper end of each rod 89 is constructed with an angled portion 91, which is disposed flat against the central bar of each side rack, as shown in Fig. 1, so as to hold the angled portion 90 at right angles to the tail end gate. However, if the angled portion 91 is disposed at right angles to the central bar 92 of each side rack, then the angled portion 90 will be disposed in a plane parallel with the sides of the tail end gate, so that the lower end portion of each rod 89 may pass between the arched strap 84ᵃ and the flange 51, that is, when arranging each side rack 87 in position.

It is clearly apparent that the sides of the hog rack may be easily removed, and the sides 62 of the wagon body substituted, as shown in Fig. 4. The sides 62 are solid as shown, as are also the wagon body extension parts 93, which are provided with bars 94, to enter the arched portions 95 of the straps 96 shown in Fig. 4. The sides 62 of the wagon body are also provided with the straps 97 having the eyes or loops 98 to receive the horizontal portions 21 of the rods 20, thereby pivotally mounting the sides. When the wagon body is utilized, the rod 36 is designed to either pass through the extension parts 93 to connect them, or through the lower portions of the sides at 99, to hold the elements in place.

The shanks 53 are provided with nuts 100, to hold the same to the cleats 44, as shown clearly in Fig. 3.

From the foregoing in connection with the annexed illustration, it is clearly apparent that the wagon body may be easily converted into a hog, shoat, or hay rack, and one which has been found desirable, efficient and practical owing to the fact that the tail end gate serves three different purposes. For instance, it acts as a gate, second it coöperates with the sides of the hog rack to afford an efficient hay rack, and third the same constitutes an essential and improved walk or chute for the hogs or live stock to ascend to the hog rack, when used in conjunction with an extension member.

The legs 101 and 102 of each side rack 87 enter the troughs 52, when the tail end gate is thrown to the position shown in Fig. 1.

The invention having been set forth, what is claimed as new and useful is:—

1. In a device as set forth, a vehicle body including a tail end gate hingedly connected thereto, means connecting the gate and the body to hold the gate in an inclined position, a gate extension member, means for detachably connecting the gate and the member, the side edges of the gate and the member having arched straps, said gate at its side edges having troughs, side racks having legs, two legs of each rack adapted to enter each trough, the end legs of each side rack having metallic strips to engage the arched straps, another of said legs of each side rack having a locking device to engage another of said arched straps for detachably locking each side rack in position, the troughs of the gate adapted to receive the sides of the body when the gate is thrown up.

2. In a device as set forth, a vehicle body including a tail end gate hingedly connected thereto and having its side edge portions provided with troughs to receive the ends of the sides of the vehicle body when the gate is vertical, a tail end gate extension having connections with the tail end gate, the side edges of the tail end gate adjacent the trough and the side edges of the extension having arched straps, tail end gate side members engaging said troughs and provided with elements engaging said straps, one of said elements adapted to be partially rotated and provided with an angled end to engage under the tail end gate to lock the tail end gate side members in position.

3. In a device as set forth, a vehicle body including a tail end gate hingedly connected thereto and having its side edge portions provided with troughs to receive the ends of the sides of the vehicle body when the gate is vertical, a tail end gate extension having connections with the tail end gate, the side edges of the tail end gate adjacent the trough and the side edges of the extension having arched straps, tail end gate side members engaging said troughs and provided with elements engaging said straps, one of said elements adapted to be partially rotated and provided with an angled end to engage under the tail end gate to lock the tail end gate side members in position, links detachably connected to the opposite side edges of the tail end gate, hooks connecting said links detachably to the sides of the vehicle body, and foothold means on the tail end gate.

In testimony whereof I have signed my name to this specification in the presence of two subscribing witnesses.

ZACHARIAH T. KIRKHAM.

Witnesses:
JOHN GRAVEN,
WILSON H. McLAIN.

Copies of this patent may be obtained for five cents each, by addressing the "Commissioner of Patents, Washington, D. C."